United States Patent [19]

Stahlecker

[11] Patent Number: 5,509,262
[45] Date of Patent: Apr. 23, 1996

[54] SUPPORTING DISK FOR A SUPPORTING DISK BEARING FOR OPEN-END SPINNING ROTORS

[75] Inventor: Fritz Stahlecker, Ueberkingen, Germany

[73] Assignees: Fritz Stahlecker, Bad Ueberkingen; Hans Stahlecker, Suessen, both of Germany

[21] Appl. No.: 234,382

[22] Filed: Apr. 28, 1994

[30] Foreign Application Priority Data

Apr. 27, 1993 [DE] Germany ............... 43 13 753.9

[51] Int. Cl.⁶ .................................................. D01H 4/12
[52] U.S. Cl. ........................................... 57/264; 57/406
[58] Field of Search .................. 57/263, 264, 265, 57/406, 407

[56] References Cited

U.S. PATENT DOCUMENTS

| | | | |
|---|---|---|---|
| 4,019,310 | 4/1977 | Seidl et al. | 57/265 |
| 4,033,107 | 7/1977 | Sasayama et al. | 57/264 X |
| 4,080,775 | 3/1978 | Stahlecker | 57/263 |
| 4,150,530 | 4/1979 | Derichs | 57/263 |
| 4,566,262 | 1/1986 | Schmucker | 57/264 |
| 4,809,491 | 3/1989 | Heinen et al. | 57/264 X |

FOREIGN PATENT DOCUMENTS

| | | |
|---|---|---|
| 2422943 | 11/1975 | Germany . |
| 2507199 | 9/1976 | Germany . |
| 2544209 | 4/1977 | Germany . |
| 3926664A | 3/1990 | Germany . |
| 4121387A | 1/1993 | Germany . |

*Primary Examiner*—Joseph J. Hail, III
*Attorney, Agent, or Firm*—Evenson McKeown Edwards & Lenahan

[57] ABSTRACT

In the case of a supporting disk for a supporting disk bearing for open-end spinning rotors, the front side is provided with signal generators for the purpose of non-contact revolution counting, which function by magnetic field lines. Preferred are permanent magnetic pins which fit into the supporting disk, and which create an induction current.

6 Claims, 3 Drawing Sheets

SUPPORTING DISK FOR A SUPPORTING DISK BEARING FOR OPEN-END SPINNING ROTORS

BACKGROUND AND SUMMARY OF THE INVENTION

The invention relates to a supporting disk for a supporting disk bearing for open-end spinning rotors, which supporting disk has a front side provided with at least one signal generator for non-contact revolution counting.

Supporting disks of this general type are described in German patent application 41 21 387. Two reflectors are embedded in suitable recesses in the surface of the front side, which are used for non-contact counting of revolutions of the open-end spinning rotors. In the case of heavy flue of the fiber material which is to be spun, a visual measurement, carried out with the aid of the reflectors, does not deliver a reliable signal.

In German patent application 25 07 199, corresponding to U.S. Pat. No. 4,150,530, the way the mentioned reflectors work is described. Accordingly, by means of non-contact counting of the revolutions of the spinning rotors, a piecing process is controlled by a travelling maintenance device. Here the reflectors are formed as colored markings, to which a photoelectrical impulse receiver is arranged at a short distance away from them, which receiver can be a component of a maintenance device, emitting a light beam which is variably reflected. The impulse receiver is connected to a plotting device. In the introductory part of the description, the fact that the triggering of the impulses can, when required, be activated by use of a capacitive or inductive proximity switch, is mentioned only briefly.

In German patent application 25 44 209, corresponding to U.S. Pat. No. 4,080,775, non-contact counting of the revolutions of spinning rotors is described with the aid of two equivalent ways, namely either by scanning the supporting disk or by scanning the shaft of the open-end spinning rotor. In the first case, the supporting disk has a marking which is scanned without contact by a measuring head during the run-up of the open-end spinning rotor. In the second case, the shaft of the open-end spinning rotor is provided with signal transmitting recesses around its circumference, which rotate past a measuring head.

In German patent application 24 22 943, a small metal false twist spindle arranged on supporting disks is described, which is provided with a cross hole and whose revolutions are scanned without contact by a sensor. The sensor comprises two coils whose magnetic fields are disturbed when the cross hole changes its position. This can be used to generate electrical signals in a plotting station.

In German patent application 39 26 664 it is disclosed that for the ascertainment of the current revolutions of an open-end spinning rotor, a sensor is advanced to the open-end spinning rotor. The open-end spinning rotor consists of ferromagnetic material and is magnetized at certain intervals. The magnetic field of the open-end spinning rotor changes with the revolutions of the open-end spinning rotor and generates various signals in this way.

In the case of practically constructed open-end spinning machines, supporting disks provided with reflectors have been used exclusively up to now for the purpose of non-contact revolution counting of open-end spinning rotors.

It is an object of the invention to carry out fail-safe revolution counting, even when the danger of flue on the supporting disks due to fiber material exists.

This and other objects are achieved according to the invention in that a signal generator is provided, which functions by means of magnetic field lines.

It is possible, while dispensing with an optical measurement, to receive reliable signals in relation to the current revolutions of the supporting disks and therefore indirectly those of the open-end spinning rotors, using the supporting disks according to the invention. This can take place in many ways.

In one version, a signal generator which generates magnetic field lines is provided, and which, for example generates an induction current in an impulse receiver; the said induction current is then evaluated at a plotting station.

In a second version a signal generator which alters magnetic field lines is provided, which for example alters the magnetic field of the coils of an impulse receiver and thereby generates plottable signals.

In the first version the signal generator is a permanent magnet, which can be fitted into a recess on the front side of the supporting disk.

In the second version, the signal generator can consist of a ferromagnetic material, for example in the form of a steel pin.

In both cases it is practical when the supporting disk consists of aluminum or synthetic material it should in any case be of a different material from that of the chosen material for the signal generator. It is advantageous when two signal generators are used which are disposed diametrically opposite to the axle of the supporting disk, so that problems of imbalance do not arise.

In the second version it is also possible for the signal generator to be a bore hole embedded in a base body of steel. An electrical signal can be alternatively received in this way.

For the sake of completeness it should be mentioned that two bore holes in the front side of the supporting disk can be used as signal genertors, whereby the inevitably arising air blast is registered and read as a signal.

In all the above it is advantageous when the front side has a flat surface. This is particularly favorable with regard to the energy consumption. Fitted-in steel or magnetic pins should be flush with the surface. Existing bore holes can, if required, be covered over with foil. Unnecessary air turbulence should be avoided at all times.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
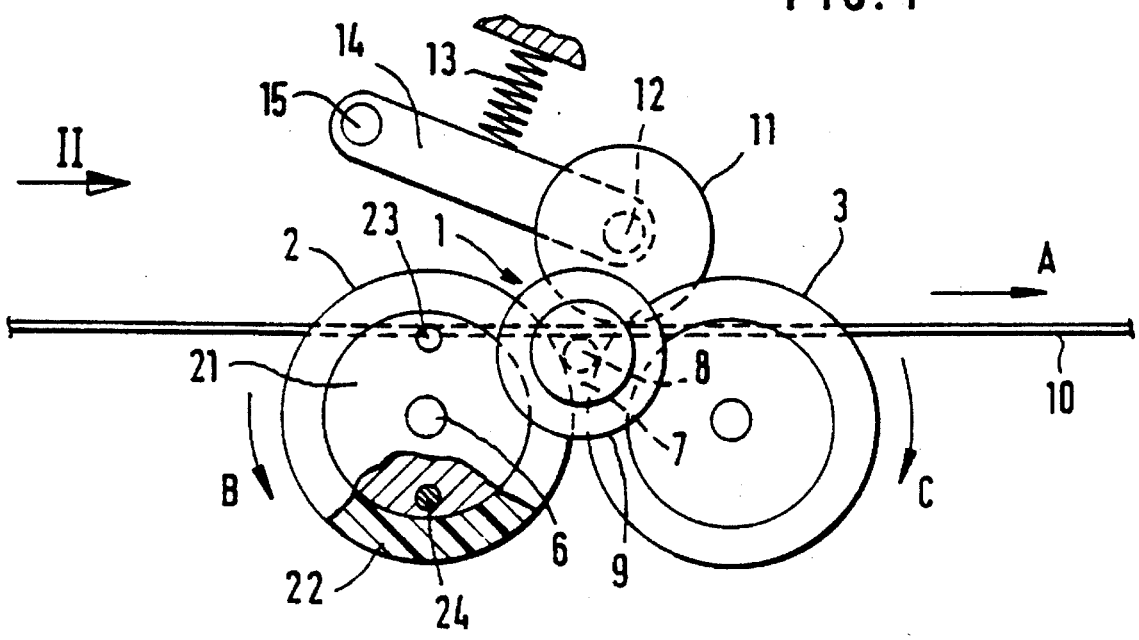
FIG. 1 is a partly sectional front view of a supporting disk bearing for an open-end spinning rotor, taken in the direction of arrow I of FIG. 2, with two signal generators which generate magnetic field lines, constructed according to a preferred embodiment of the invention.
Figure 2:
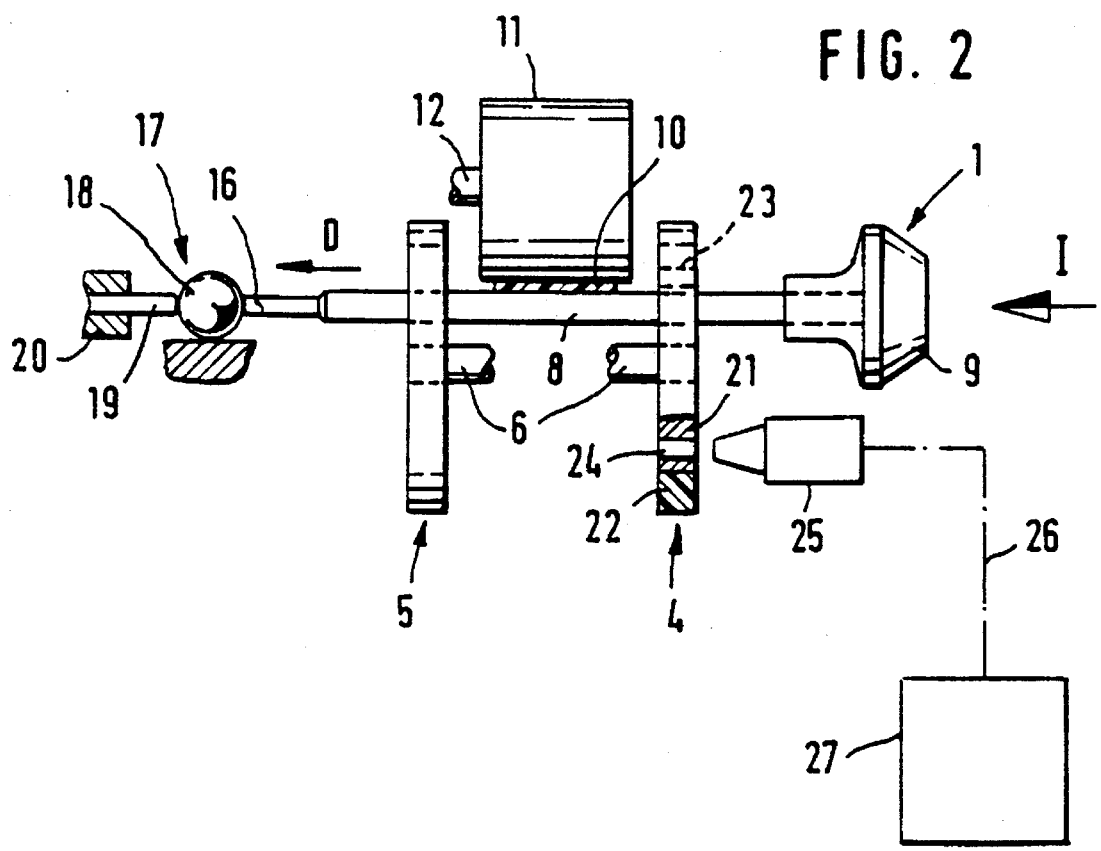
FIG. 2 is a partly sectional view in the direction of arrow II of FIG. 1, showing an impulse receiver connected to a plotting station.

The supporting disk bearing for an open-end spinning rotor 1 as shown in FIGS. 1 and 2 is a component of an open-end spinning unit. It comprises four supporting disks 2, 3, altogether, which are arranged as supporting disk pairs 4, 5, each on a common shaft 6. The shafts 6 run in anti-friction bearings arranged in bearing housings (not shown). The supporting disk pairs 4,5 are so arranged that they form two wedge-shaped gaps 7, in which the shaft 8 of the open-end spinning rotor 1 is supported in radial direction. The shaft 8 carries a rotor or rotor dish 9 at one end, in whose interior chamber the formation of yarn takes places in the known way.

The shaft 8 is driven by a tangential belt 10, which runs between the supporting disk pairs 4, 5 and which holds the shaft 8 in the wedge-shaped gap 7. The tangential belt 10 is tensed by a tension pulley 11 near the shaft 8. The tension pulley 11 is arranged in a swivel arm 14, which is pressed by a tension spring 13 and is pivotable around a swivel axis 15 extending transversely to the tangential belt 10, the tension pulley 11 being rotatable around an axle 12.

The shafts 6 of the supporting disk pairs 4, 5 are, in a known way, slightly inclined in opposite directions relative to each other so that, in connection with the sense of direction A of the tangential belt 10, due to the rolling of the shaft 8 on the rotating supporting disks 2, 3, according to arrow direction B and C, an axial thrust in the direction of arrow D is generated, which weights the shaft 8 with its free end 16 in the direction of a step bearing 17. The step bearing 17 contains a ball 18, which is continuously excited to vibrations due to the oscillations of the machine, the ball 18 being held by a thrust bearing 19 on the opposite side to the shaft 8, and being arranged adjustably in a part of a casing. Due to the machine oscillations, the ball 18 is excited to vibrations with low amplitude and high frequency, whereby due to the varying supporting points, a rotation of the ball 18 around several axes takes place.

The supporting disks 2, 3 each consist of a disk-like base body 21 as well as of a synthetic ring 22 connected to it, whose circumferential surface forms the bearing surface for the shaft 8 of the open-end spinning rotor 1. The base body 21, as seen in FIGS. 1 and 2, practically consists of aluminum or synthetic material.

It is known that during spinning, threads occasionally break, due to several causes. In such a case, a thread end which has already been spun must be joined again to fibers which have been fed into the inner chamber of the rotor dish 9. This happens often during the run-up of an open-end spinning rotor 1 which has previously been braked. It is thereby important to know at certain points during the run-up how many revolutions per minute the open-end spinning rotor 1 currently has. This is done in practice by non-contact counting of the current revolutions of a supporting disk 2, which gives indirect information about the current revolutions of the shaft 8 of the open-end spinning rotor 1 which is supported by the supporting disk pairs 4,5.

Because, as known already from practical operation, supporting disks optically scanned by reflectors sometimes deliver false signals, in particular when there is heavy flue due to fiber material flying around, it is intended according to the invention to use two signal generators 23 and 24 which function by means of magnetic field lines.

As shown in FIGS. 1 and 2, the signal generators 23 and 24 are transmitters which generate magnetic fields; they are formed as permanent magnetic pins which are flush on the front side and fitted securely into suitable bore holes. When the supporting disk 2 containing the signal generators 23 and 24 is rotated, a magnetic field is generated, which in turn is capable of generating an induction current in an impulse receiver 25. The impulse receiver 25 can be a component of a travelling piecing device, which moves lengthways along the open-end spinning machine (not shown), and advanced to a front side of the supporting disk 2 to be scanned in the area of its radius, on which the signal generators 23, 24, formed as magnetic pins, are attached. The distance between the impulse receiver 25 and the surface of the front side of the supporting disk 2 measures most advantageously between 3 and 6 mm. The induction current which has been generated is conducted over an electrical wire 26 to a plotting station 27, which is connected to various pilot motors of the piecing device (not shown).

This inductive method does not have the disadvantage that when the supporting disk pairs 4 and 5 are covered in flue, inaccurate signals are delivered.

Figure 3:
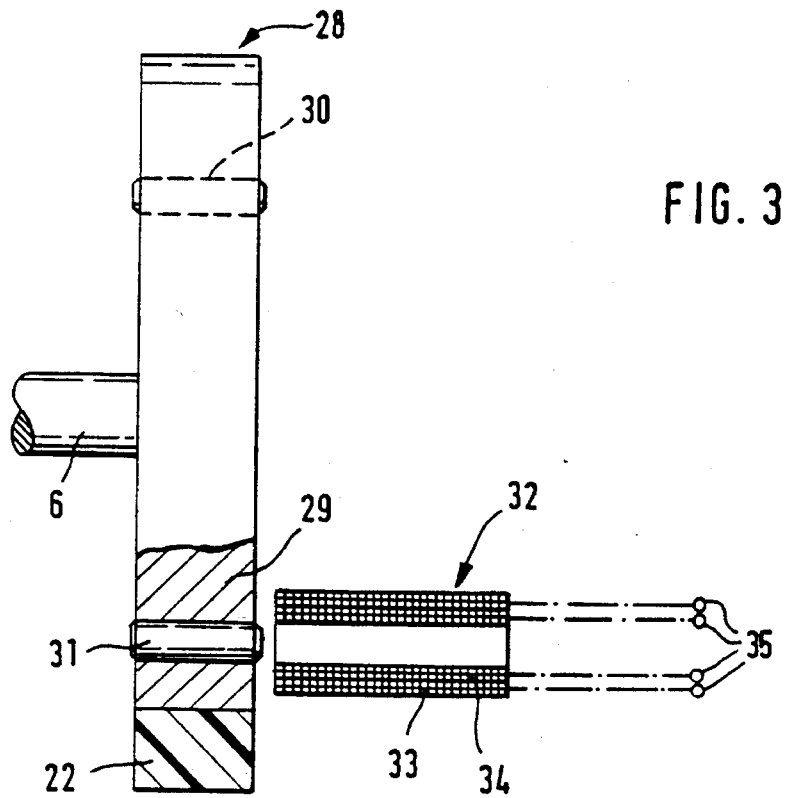
FIG. 3 is a somewhat enlarged supporting disk in a view similar to FIG. 2, with two signal generators which alter magnetic fields.

The supporting disk 28 as shown in FIG. 3 comprises two signal generators 30 and 31, which do not generate magnetic field lines, but rather alter magnetic fields. In the case of the supporting disk 28 as shown in FIG. 3, steel pins 30 and 31, in place of permanent magnet pins (as shown in FIGS. 1 and 2) are fitted into suitable bore holes of the base body 29 from the front side. When the supporting disk 28 is rotated, the steel pins 30 and 31 run past an impulse receiver 32, which then undergoes a change in magnetic field. The impulse receiver 32 can for example contain two coils 33 and 34, concentrically arranged to each other, which are connected to a plotting station by electrical terminals 35.

Figure 4:
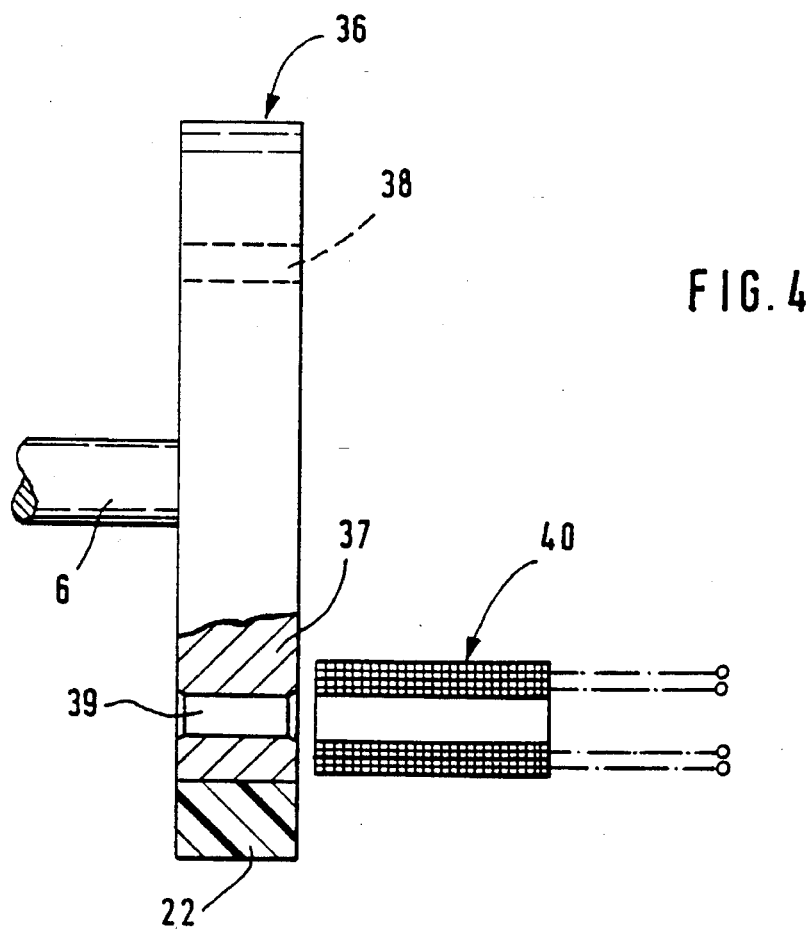
FIG. 4 is a supporting disk similar to FIG. 3, with a bore hole formed as a signal generator.

As shown in FIG. 4, a supporting disk 36 is used whose base body 37 consists of steel, which only has bore holes functioning as signal generators 38 and 39. When the supporting disk 36 is rotating, these bore holes can also disturb the magnetic field of an impulse receiver 40 and thereby generate signals which can be read by a plotting station.

Figure 5:
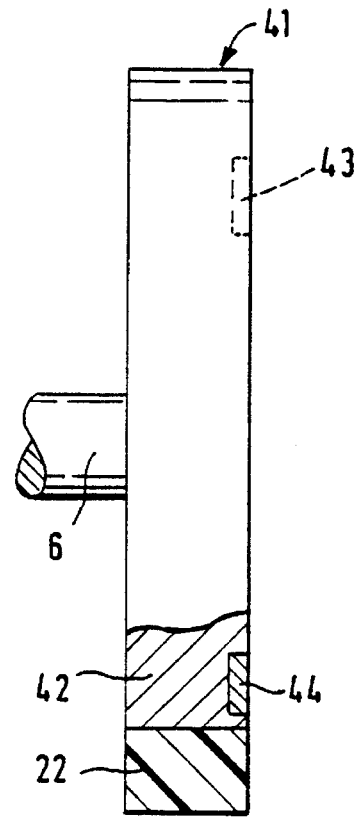
FIG. 5 is a supporting disk similar to FIG. 2, with button-like permanent magnets in bottom holes arranged on the front side.

It is not absolutely necessary to fit the signal generators flush in through bore holes of a supporting disk. As according to FIG. 5, a supporting disk 41 is intended whose base body 42 consists of for example diecast, and which contains two diametrically opposed blind holes for tablet-like signal generators 43 and 44, which are permanent magnets and are fitted flush into the blind holes. With this design magnetic fields can also be generated, whereby the surface of the front side is flat, without elevations or grooves.

Figure 6:
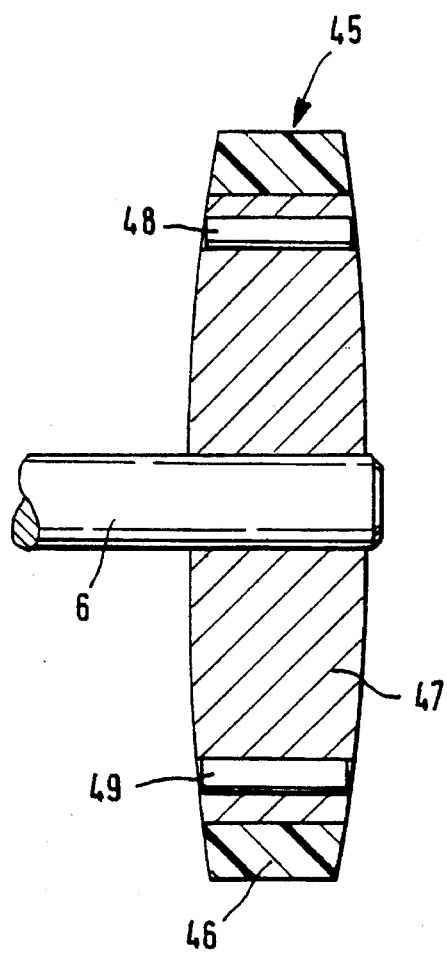
FIG. 6 is a supporting disk similar to FIG. 3, which in longitudinal section—has a thickening in the area of the axle.

As shown in FIG. 6 a supporting disk 45 is intended, which—in longitudinal section—is slightly convex, that is, it is widest in the area of the shaft 6. With this design, permanent magnet pins or steel pins are again fitted into suitable bore holes, which function as signal generators 48 and 49.

It should be noticed that it is desirable to provide the individual supporting disks 2, 3 with as smooth a surface as possible, having no elevations or notches. In relation to energy consumption, it is practical when the front sides are flat or in section—slightly convex.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A supporting disk for a supporting disk bearing for open-end spinning rotors, a front side of said supporting disk being provided with two permanent magnets that are disposed diametrically opposite one another and which constitute signal generators generating magnetic field lines rotating with the disk, wherein said permanent magnets are fitted into respective recesses so as to be flush on the front side, wherein said supporting disk comprises a disk like base body composed of a first material and a synthetic ring of a different material surrounding the base body, wherein said recesses are located in said base body, and wherein said recesses are holes extending through the disk.

2. A supporting disk according to claim 1, wherein the front side has a flat surface.

3. A supporting disk, according to claim 1, wherein said first material of said base body is aluminum.

4. A supporting disk according to claim 3, wherein the supporting disk has a slightly convex shape with a maximum axial length adjacent a connection of the disk to a support shaft therefor.

5. A supporting disk according to claim 1, wherein said first material of said base body is a synthetic material.

6. A supporting disk according to claim 1, wherein the supporting disk has a slightly convex shape with a maximum axial length adjacent a connection of the disk to a support shaft therefor.

* * * * *